United States Patent

Blank et al.

[11] Patent Number: 5,875,341
[45] Date of Patent: Feb. 23, 1999

[54] METHOD FOR MANAGING INTERRUPT SIGNALS IN A REAL-TIME COMPUTER SYSTEM

[75] Inventors: Felix Blank; Peter Schicklinski; Bettina Sterr; Ursula Wiesinger, all of Munich, Germany

[73] Assignee: Siemens Aktiengesellschaft, Munich, Germany

[21] Appl. No.: 719,413

[22] Filed: Sep. 24, 1996

[30] Foreign Application Priority Data

Sep. 25, 1995 [DE] Germany .................. 195 35 546.6

[51] Int. Cl.$^6$ ................................................. G06F 13/00
[52] U.S. Cl. ...................... 395/733; 395/735; 395/736; 395/737; 395/738; 395/739; 395/740; 395/741; 395/742; 395/591
[58] Field of Search ..................... 395/733, 735, 395/736, 737, 739, 565, 591, 734, 738, 740, 741, 742

[56] References Cited

U.S. PATENT DOCUMENTS

| | | | |
|---|---|---|---|
| 3,778,780 | 12/1973 | Moore | 340/172.5 |
| 3,905,025 | 9/1975 | Davis et al. | 340/172.5 |
| 4,015,243 | 3/1977 | Kurpanek et al. | 340/172.5 |
| 4,079,448 | 3/1978 | Nguyen et al. | 364/200 |
| 4,247,894 | 1/1981 | Beismann et al. | 364/200 |
| 4,488,227 | 12/1984 | Miu et al. | 364/200 |
| 4,719,565 | 1/1988 | Moller | 364/200 |
| 4,768,149 | 8/1988 | Konopik et al. | 364/200 |
| 4,885,681 | 12/1989 | Umeno et al. | 364/200 |
| 5,036,539 | 7/1991 | Wrench, Jr. et al. | 381/43 |
| 5,109,489 | 4/1992 | Umeno et al. | 395/275 |
| 5,247,671 | 9/1993 | Adkins et al. | 395/650 |
| 5,301,312 | 4/1994 | Christopher, Jr. et al. | 395/575 |
| 5,390,329 | 2/1995 | Gaertner et al. | 395/650 |
| 5,392,409 | 2/1995 | Umeno et al. | 395/400 |
| 5,396,632 | 3/1995 | Gillet | 395/725 |
| 5,418,968 | 5/1995 | Gobeli | 395/725 |
| 5,515,538 | 5/1996 | Kleiman | 395/733 |
| 5,535,380 | 7/1996 | Bergkvist, Jr. et al. | 395/550 |
| 5,539,729 | 7/1996 | Bodnar | 370/18 |
| 5,542,076 | 7/1996 | Benson et al. | 395/733 |
| 5,588,125 | 12/1996 | Bennett | 395/306 |
| 5,652,890 | 7/1997 | Foster et al. | 395/750 |
| 5,689,713 | 11/1997 | Normoyle et al. | 395/736 |
| 5,717,932 | 2/1998 | Szczepanek et al. | 395/733 |
| 5,717,933 | 2/1998 | Mann | 395/735 |

*Primary Examiner*—Meng-Ai T. An
*Assistant Examiner*—Valerie Darbe
*Attorney, Agent, or Firm*—Hill & Simpson

[57] ABSTRACT

A method for the operation of a computer system controlled by a real-time operating system, which computer system processes interrupt signals. Upon the occurrence of an interrupt signal, the computer system interrupts a program that is to be processed at that time. The acceptance of further interrupt signals is blocked, and an interrupt routine belonging to this interrupt signal is called. During the processing of this interrupt routine, a first part of the program parameters of the program that is interrupted upon the occurrence of the interrupt signal is intermediately stored, and at least one datum concerning the interrupt signal is stored in an interrupt memory. A branching takes place from the interrupt routine to an interrupt management routine (IVR), whereby the acceptance of further interrupt signals is again cleared during the processing of the IVR. During the processing of the IVR, the datum belonging to the interrupt signal is erased; the remaining part of the program parameters of the program that is interrupted upon the occurrence of the interrupt signal is intermediately stored. Dependent on the datum concerning the interrupt signal, at least one reaction routine belonging to this interrupt signal is activated. After the processing of the IVR, the operating system branches back to the program that was interrupted upon the occurrence of the interrupt signal, using the intermediately stored program parameters.

19 Claims, 4 Drawing Sheets

METHOD FOR MANAGING INTERRUPT SIGNALS IN A REAL-TIME COMPUTER SYSTEM

BACKGROUND OF THE INVENTION

The present invention relates to methods for operating a real-time computer system controlled by a real-time operating system, which computer system processes interrupt signals, e.g., of a technical process.

Methods of this type are used for example in real-time computer systems utilized in telecommunication modules of the public and private networks. A real-time computer system is characterized in that the processing of a program activated, for example, as a reaction to an interrupt signal can be interrupted within a known limited time interval, in order to continue the processing of this program only when higher-priority programs have been processed. During the processing of a program in telecommunication modules, e.g. up to about 50,000 interrupt signals can occur per second, which respectively require an interruption of a program to be processed at that time and a reaction to the interrupt signal.

Known real-time computer systems block the acceptance of further interrupt signals for a predetermined time interval, called the interrupt blocking time, so that interrupt signals coming in during this time interval are not taken into account is processed, and information or instructions can be lost. The interrupt blocking time is required so that the microprocessor can secure its registers, can react at least partly to the interrupt signal, and can again update its registers in order to be able to continue the interrupted program. The longer this interrupt blocking time is, all the more incoming interrupt signals go without being processed. An improved method for the operation of a real-time computer system, in which the interrupt blocking time is reduced, would be advantageous.

SUMMARY OF THE INVENTION

An object of the invention is to develop a real-time operating system component that permits the acquisition of, and reaction to, the highest possible number of occurring interrupt signals per time unit.

To that end, in an embodiment, the invention provides the following method steps: when an interrupt signal occurs, the real-time computer system interrupts a program processing at that time; the acceptance of further interrupt signals is blocked, and an interrupt routine belonging to this interrupt signal is called; during the processing of this interrupt routine, a first group of one or more program parameters of the program that was interrupted upon the occurrence of the interrupt signal is intermediately stored; at least one datum concerning the interrupt signal is stored in an interrupt memory; a branching takes place from the interrupt routine to an interrupt management routine, whereby the acceptance of further interrupt signals is again cleared during the processing of the interrupt management routine; during the processing of the interrupt management routine, the datum belonging to the interrupt signal in the interrupt memory is erased; the remainder of the program parameters of the program that was interrupted upon the occurrence of the interrupt signal are intermediately stored; depending on the datum concerning the interrupt signal in the interrupt memory, at least one reaction routine belonging to this interrupt signal is activated and, if warranted, is processed with activation of the real-time operating system; and after the processing of the interrupt management routine, the real-time operating system branches back to the program that was interrupted upon the occurrence of the interrupt signal, using the intermediately stored program parameters.

The invention is based on the consideration that a shortening of the interrupt blocking time contributes to the capacity for processing the greatest possible number of interrupt signals. The interrupt blocking time can be shortened when previously necessary command sequences from an interrupt routine are transferred to external storage, which sequences fall in the interrupt blocking time in known methods. An interrupt management routine can be provided for reaction routines belonging to the individual interrupt routines, in which those actions for the processing of the interrupt signal that do not absolutely have to be executed immediately upon the occurrence of the interrupt signal are respectively transferred to external storage from the associated interrupt routines. These actions include e.g. the securing of some of the register data of the microprocessor, the majority of the steps previously carried out in the interrupt routine for the reaction to the interrupt signal, and the restoring of the register data of the microprocessor that did not have to be secured immediately upon the occurrence of the interrupt signal.

The register data of the microprocessor that must be secured immediately upon the occurrence of the interrupt signal is referred to in the following description of the first part of the program parameters (context I parameters) of the program that is interrupted upon the occurrence of the interrupt signal, and can be, e.g. the content of the flag register of the microprocessor. The rest of the data to be secured are referred to as the remaining part of the program parameters (context II and III parameters) of the program that is interrupted upon the occurrence of the interrupt signal.

Since during or upon the processing of the interrupt management routine the acceptance of further interrupt signals is again cleared, the interrupt blocking time is shortened considerably in contrast to known methods. Consequently, it is also the case that fewer interrupt signals are thereby lost, and fewer data that are available only for a short time upon occurrence of the interrupt signal are lost.

An advantageous construction of the inventive method is that the clearing of the acceptance of further interrupt signals ensues at the beginning of the interrupt management routine. Due to a clearing of the acceptance of further interrupt signals that takes place as early as possible, the interrupt blocking time is determined only through an absolutely necessary time interval, and is thus maximally shortened.

In a preferred embodiment of the invention, the storing of the remainder part of the program parameters of the program that is interrupted upon the occurrence of the interrupt signal is intermediately stored, partly in a first stack memory for program parameters (context II), which memory is allocated to the interrupted program, and partly in a second stack memory for program parameters (context III), which memory is allocated to the interrupt management routine. In this way, memory space can be saved, since the program parameters stored in the second stack memory do not have to be additionally stored for each interrupted program.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

In the figures, the method steps in which the acceptance of interrupt signals is blocked are indicated by double arrows. On the other hand, single arrows identify method steps in which the acceptance of further interrupt signals is cleared.

Figure 1:
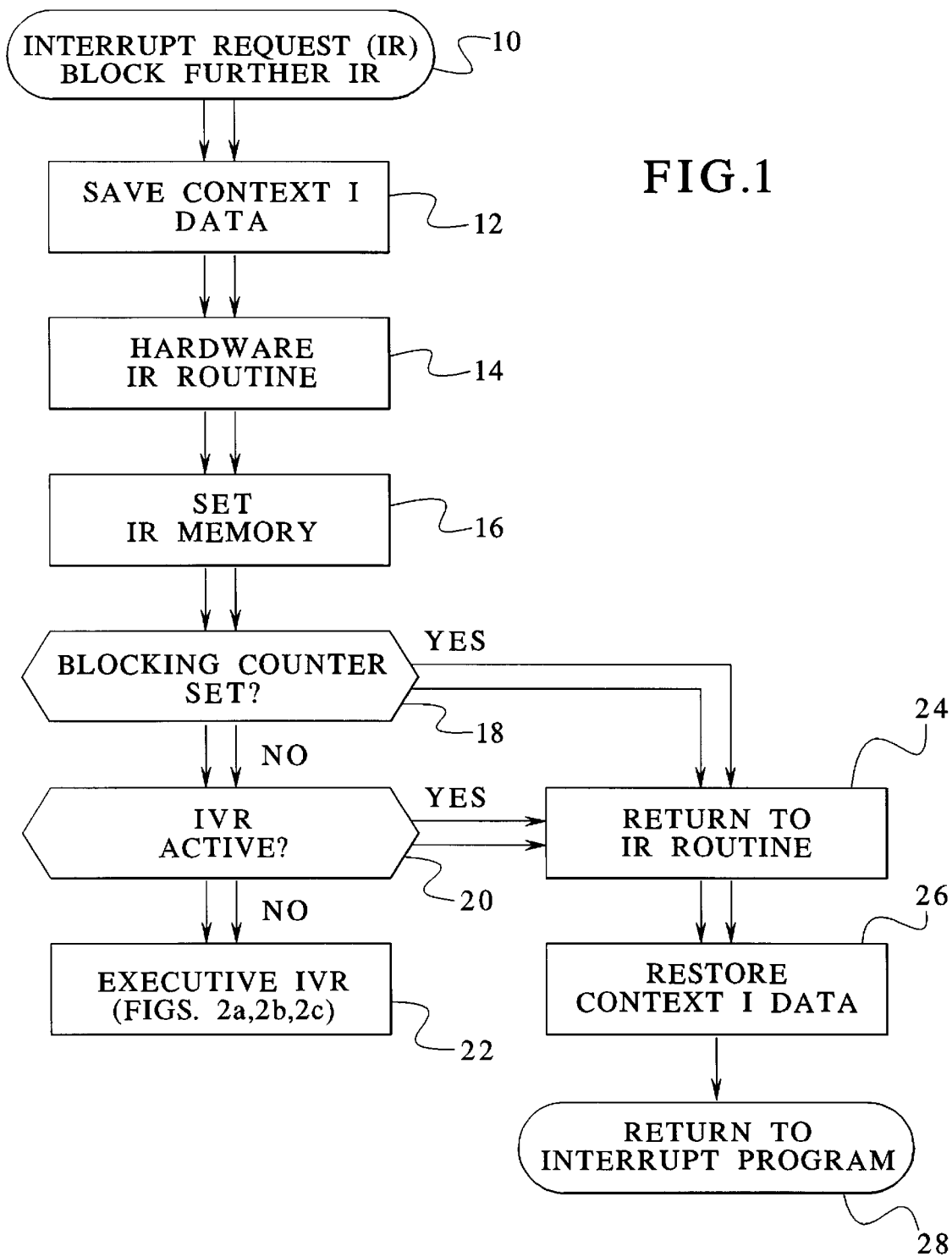
FIG. 1 is a flow chart of method steps undertaken upon the occurrence of an interrupt signal.

FIG. 1 illustrates a flow chart of steps of a method embodying principles of the invention which is undertaken upon the occurrence of an interrupt signal (step 10). Immediately after the occurrence of the interrupt signal, the acceptance of further interrupt signals is blocked by the real-time computer system. So that the microprocessor can continue the processing of the interrupted program at a later time after the interruption by the interrupt signal, the state of its registers must be stored before further steps for the processing of the current interrupt signal are carried out. As already stated, that part of the program parameters of the program interrupted upon the occurrence of the interrupt signal that must be stored or saved immediately after the occurrence of the interrupt is designated context I parameters (even though it may be a single item). This saving ensues while an interrupt block (step 12) is in effect, whereby the program parameters are stored in a stack memory in a predetermined sequence.

After the microprocessor is again allowed to alter the register contents after the saving of the register data, it can confirm the acceptance of the interrupt signal to other components of the real-time computer system, such as e.g. circuits for accepting interrupt (step 14). In known methods, the method steps 12 and 14 are carried out within the interrupt routine, and thus should also be regarded here as components of an interrupt routine.

So that the interrupt signal can be processed later, the microprocessor stores a datum that points to the interrupt signal in an interrupt memory (step 16). This interrupt memory can be e.g. a memory cell comprising several bits combined into one memory word, in which a particular bit is set according to the type of interrupt signal that occurs, so that it can be determined later which interrupt signal occurred. This possibility is described below.

The microprocessor subsequently checks whether, at the time of the occurrence of the interrupt signal, program routines are being processed in the real-time computer system that are time-critical and thus may not be interrupted (step 18). The number of such non-interruptible programs is stored by the microprocessor in a memory cell, e.g. in a blocking (or block) counter with a determined initial value. The blocking counter is increased upon each calling of a non-interruptible program, and is correspondingly decreased after the processing of a non-interruptible program. In method step 18, the microprocessor can also determine whether non-interruptible programs are being processed at the current time. If this is not the case, i.e. if the memory cell of the blocking counter has the determined initial value, the microprocessor checks whether an interrupt management routine (IVR) is already active, by querying a state memory cell in which the state of the interrupt management routine is stored (step 20). If the interrupt management routine is not activated, it is called (step 22). The method steps to be executed within the interrupt management routine are explained further below on the basis of FIGS. 2a, 2b and 2c.

If it is determined in method step 18 that the content of the blocking counter deviates from its initial value, i.e. a non-interruptible program routine is active, or if it is determined in method step 20 on the basis of the state memory cell that the interrupt management routine has already been activated, a jump back to the interrupt routine ensues (step 24). In the interrupt routine, context I is restored, by reading the data for the processor registers out of the stack memory again, in a sequence that is the reverse of that in which they were stored (step 26). Afterwards, there ensues the clearing of the acceptance of further interrupt signals, and a return takes place to the program that was interrupted upon the occurrence of the interrupt, in order to process it further (step 28).

Up to the last method step 28, all method steps in FIG. 1 are carried out while the interrupt block is in effect, so that up to this point there results no essential advantage over the prior art with respect to the interrupt blocking time. The savings is first visible on the basis of the method steps according to FIGS. 2a, 2b, 2c, since in the method sequence shown there the majority of the method steps are carried out with the clearing of the acceptance of further interrupt signals.

Figure 2A:
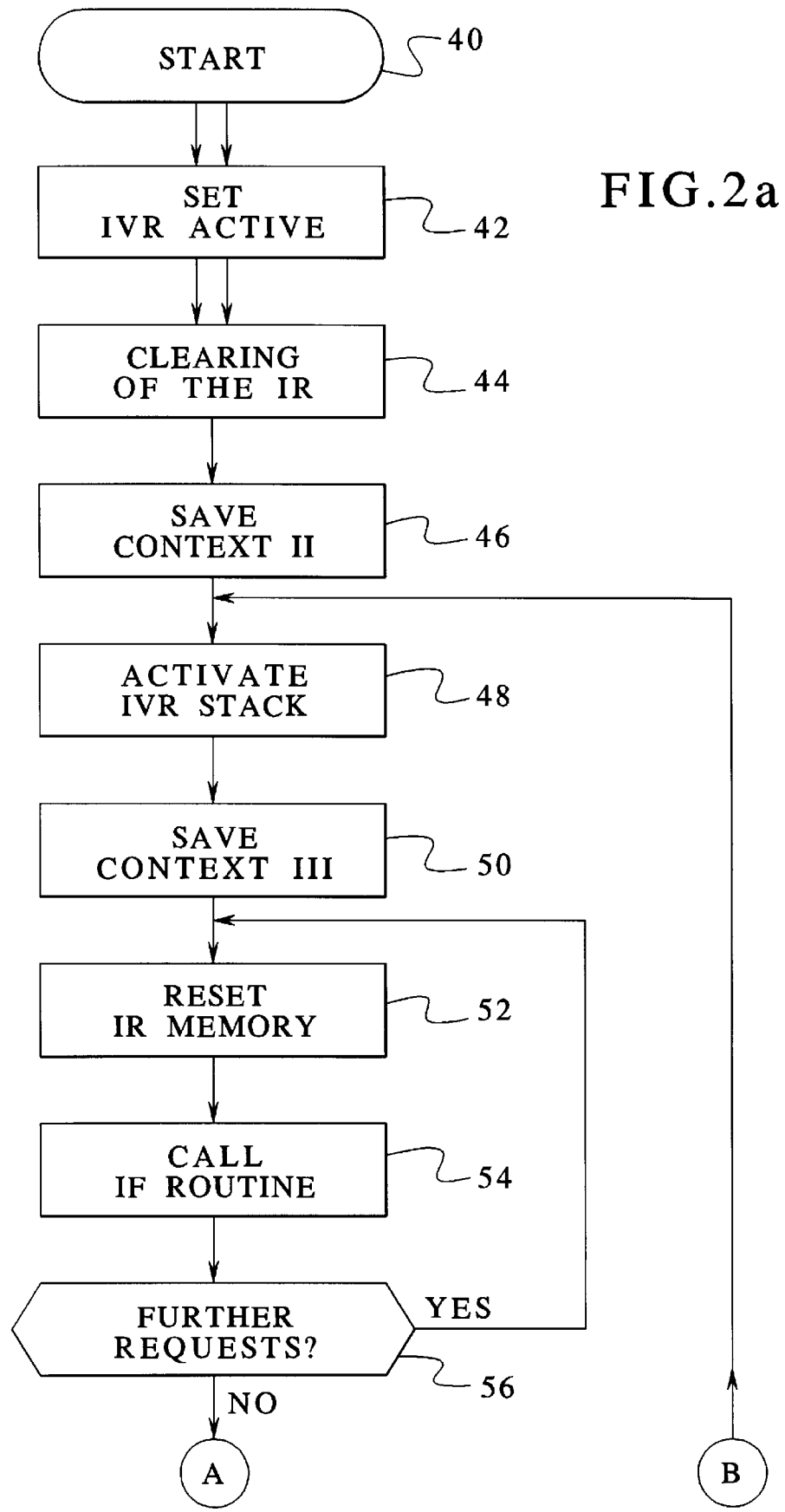
FIGS. 2a, 2b and 2c constitute a flow chart of the method steps executed in the context of the processing of an interrupt management routine.
Figure 2B:
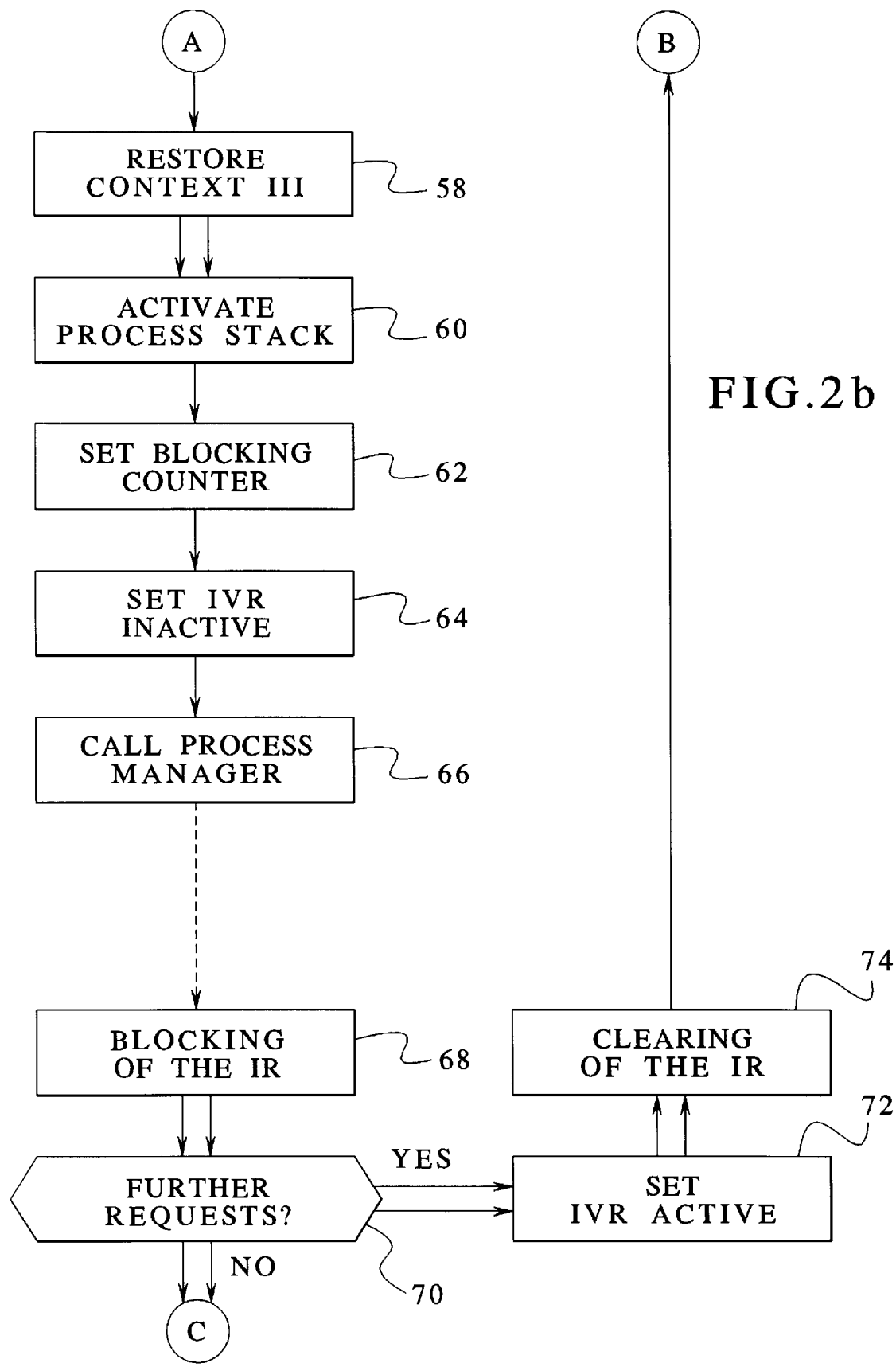
Figure 2C:
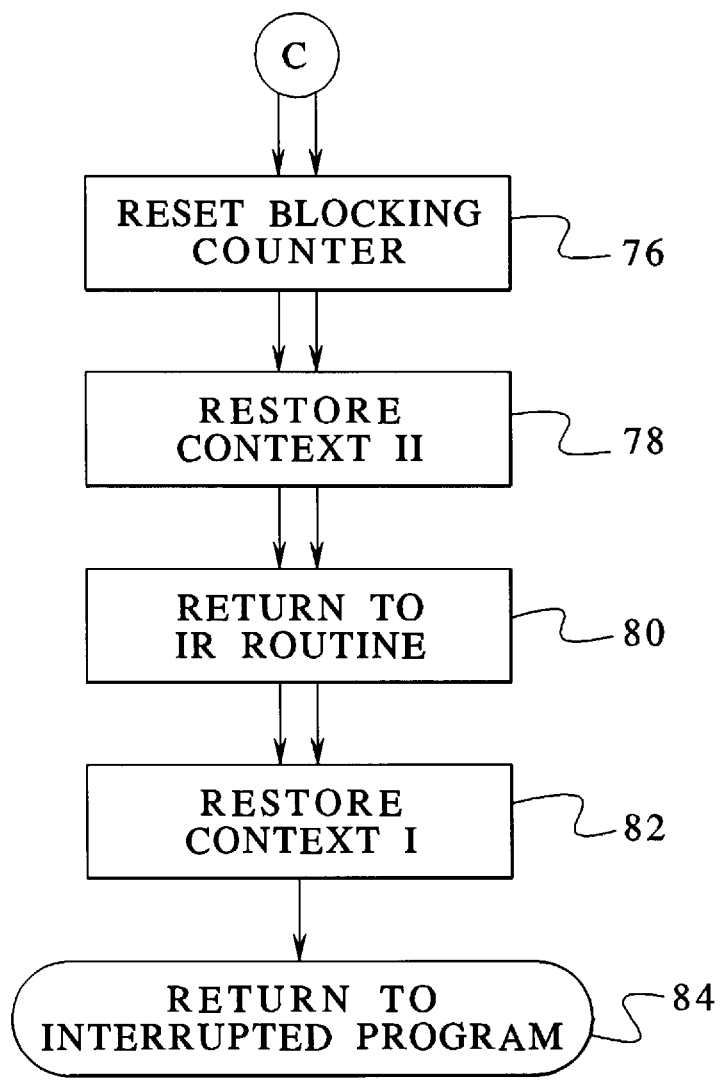

FIGS. 2a, 2b, and 2c show a flow chart of steps of an interrupt management routine. After the interrupt management routine has been called in method step 22, the microprocessor begins the processing of the method steps of the interrupt management routine (step 40).

Subsequently, the state memory cell is set (step 42). Upon the occurrence of further interrupt signals, it can thereby be determined in method step 20 whether the interrupt management routine has already been activated, since in a correct execution of the method it may be activated only once.

In order to shorten the interrupt blocking time over known methods to the greatest possible extent, the acceptance of further interrupt signals is cleared at once (step 44). After method step 44 has been processed, it is thus possible to accept and process further interrupt signals. These further interrupt signals are registered in the interrupt memory by the microprocessor as data in the form of set bits, in method step 16. Upon the subsequent continuation of the processing of the method steps in the interrupt management routine, these further interrupt signals can be taken into account.

The program parameters of the program that was interrupted upon the occurrence of the interrupt signal, which parameters were not yet stored as context I in method step 12, are divided into two groups. One group is formed by program parameters that are intermediately saved or, respectively, intermediately stored in a stack memory for program parameters, which memory is allocated to the interrupted program; this group of program parameters is designated or referred to herein as context II parameters. The further group of remaining program parameters is intermediately stored in a stack memory for program parameters, allocated to the interrupt management routine, and is designated or referred to as context III parameters.

By means of this division of the remaining program parameters, a considerable savings in memory space can be achieved, since the context III parameter does not have to be respectively stored in the stack memory of the interrupted program, but rather only in the stack memory of the interrupt management routine.

The saving of the context II parameters (step 46) ensues, as mentioned, in a stack memory allocated to the interrupted program. The stack memory of the interrupt management routine is subsequently activated (step 48), and a saving of context III parameters ensues in this stack memory (step 50). A later continuation of the program that was interrupted upon the occurrence of the interrupt signal is possible by means of the storing of the program parameters. The resetting of the bit allocated to the interrupt signal in the interrupt memory, which was set upon the occurrence of the interrupt in method step 16, subsequently ensues in step 52. It is thereby possible that the same interrupt signal can be again accepted and evaluated that is being processed at that time by the interrupt management routine.

After all preparations for the calling of a routine for the processing of the interrupt signal are concluded, the processing routine corresponding to the interrupt signal is called (step 54). During the execution of the processing routine, further interrupt signals can be accepted, which are then noted by the setting of corresponding bits in the interrupt memory in method step 16. After the execution of the processing routine in method step 54, the interrupt memory is queried for set bits by the microprocessor (step 56). If bits of this sort are set in the interrupt memory, the method is continued in method step 52. The method thereby finds itself in an operational loop formed by method steps 52 to 56. During the processing of the operational loop, further interrupt signals can be accepted that are signaled via the interrupt memory of the interrupt management routine, and are taken into account during the query in method step 56. Since, in contrast to known methods, the processing of the interrupt signals ensues with interrupt clearance, the interrupt blocking time can be considerably shortened.

It is advantageous if the query for set bits in the interrupt memory in method step 56 takes into account the priorities of the accepted interrupt signals. In this way, the individual bits of the interrupt memory can be queried corresponding to an order of priority in the memory word of the interrupt memory, e.g. respectively from right to left, whereby a priority of the individual bits is determined that decreases from right to left in the memory word.

The continuation of the method with the method steps of FIG. 2b does not ensue until all set bits in the interrupt memory have been reset (cf. method step 52) and the corresponding processing routines have been executed (cf. method step 54). The restoring of context III parameters (step 58) ensues by reading the program parameters of context III parameters out from the stack memory allocated to the interrupt management routine in the reverse sequence from that in which they were stored.

There are two different possibilities for the calling of the interrupt management routine. The first possibility, already described, is the calling according to method step 22. In this case, the method steps 24 to 28 are not processed. As a second possibility, the interrupt management routine is called via the real-time operating system, if non-interruptible programs are being processed at the time of the occurrence of the interrupt signal, and the blocking counter was thereby already set in method step 18. The method steps 24 to 28 would accordingly have already been executed before the calling of the interrupt management routine by the real-time operating system, as explained above, and thus may not be executed again within the interrupt management routine.

The calling of the interrupt management routine via the real-time operating system can ensue in such a way that after the execution of a non-interruptible program and after the decrease in the blocking counter it is checked as to whether the blocking counter has the initial value, and whether at least one bit allocated to an interrupt signal is set in the interrupt memory. If both conditions are met, the interrupt management routine is called.

In order to distinguish the two possibilities and to be able to process them correspondingly, a program stack memory allocated to a program management routine can be activated after the restoring of context III parameters in method step 58, by loading the stack register of the microprocessor with the address of the stack memory of the interrupted program (step 60). The program management routine is a component of the real-time operating system, and coordinates the processing of programs by noting programs to be processed and starting their processing in a predetermined sequence.

An increase in the blocking counter subsequently ensues (step 62), since the following method steps 64 and 66 may not be interrupted. Subsequently, the interrupt management routine is marked as inactive, e.g. by means of a setting of the state memory cell to zero (step 64), in order to enable the interrupt management routine to be processed again.

A calling of the program management routine (step 66) then ensues, which if warranted brings another program to execution. After the termination thereof, the program management routine causes a return to the interrupt management routine and a blocking of the acceptance of further interrupt signals (step 68).

Since during the processing of method steps 56 to 68 further interrupt signals could have been accepted, which signals have as a consequence the setting of allocated bits in method step 16 in the interrupt memory, during the processing of the interrupt management routine, before the termination thereof, it is again queried whether bits are still set in the interrupt memory (step 70). If this is the case, the interrupt management routine is not terminated, but rather is set active again using the corresponding state memory cell (step 72), and the acceptance of further interrupt signals is again cleared (step 74). The method is subsequently continued in method step 48. The interrupt management routine is now in a further operational loop consisting of method steps 48 to 74. This further operational loop can be terminated only in method step 70, if all bits in the interrupt memory have already been reset. In this case, there ensues a resetting of the blocking counter via a corresponding lowering of its value (step 76).

There subsequently ensues a restoring of context II (step 78), in that a switchover takes place to the stack memory of the program that was interrupted upon the occurrence of the interrupt signal, and the program parameters stored there are read again in a sequence that is the reverse of that in which they were stored.

The return to the interrupt routine ensues in step 80, in which context I is then restored (step 82). Subsequently, a return takes place to the program that was interrupted upon the occurrence of the interrupt signal (step 84). The interrupt management routine is thereby concluded.

Although modifications and changes may be suggested by those skilled in the art, it is the intention of the inventors to embody within the patent warranted hereon all changes and modifications as reasonably and properly come within the scope of their contribution to the art.

We claim:

1. A method for operating a real-time computer system controlled by a real-time operating system, which computer system processes interrupt signals, comprising the following steps:

when an interrupt signal occurs, the real-time computer system interrupts any program processing at that time;

the acceptance of further interrupt signals is blocked, and an interrupt routine for this interrupt signal is executed;

during the processing of the interrupt routine, a first group of program parameters of the program interrupted upon the occurrence of the interrupt signal is intermediately stored;

at least one datum concerning the interrupt signal is stored in an interrupt memory, branching to an interrupt management routine depending upon whether at least one program routine, which may not be interrupted, is being processed in the computer system;

whereby the acceptance of further interrupt signals is again cleared during the processing of the interrupt management routine;

during the processing of the interrupt management routine, the datum belonging to the interrupt signal in the interrupt memory is erased, the remainder of the program parameters of the program that was interrupted upon an occurrence of the interrupt signal are intermediately stored;

depending on the datum of the interrupt signal in the interrupt memory, at least one reaction routine belonging to this interrupt signal is activated and, if warranted, is processed with activation of the real-time operating system;

after the processing of the interrupt management routine, the real-time operating system branches back to the program that was interrupted upon the occurrence of the interrupt signal, using the intermediately stored program parameters.

2. The method according to claim 1, characterized in that the clearing of the acceptance of further interrupt signals ensues at the beginning of the interrupt management routine.

3. The method according to any of claims 1 and 2, characterized in that the first group of the program parameters comprises the content of processor registers at the time of the interruption of a microprocessor controlled by the real-time operating system.

4. The method according to any of claims 1 and 2, characterized in that the remainder of the program parameters that remains during the processing of the interrupt management routine contains information concerning the state of the program that is halted upon the occurrence of the interrupt signal, and information that must be restored for the later continuation of the interrupted program.

5. The method according to claim 1, characterized in that the storing of the remainder of the program parameters of the program that is interrupted upon the occurrence of the interrupt signal are intermediately stored partly in a first stack memory for program parameters, which memory is allocated to the interrupted program, and partly in a second stack memory for program parameters, which memory is allocated to the interrupt management routine.

6. The method according to claim 1, characterized in that given several interrupt signals that follow upon one another, data belonging to these interrupt signals are stored in the interrupt memory.

7. The method according to claim 6, characterized in that the data concerning accepted interrupt signals are stored according to a predetermined order of priority, and in that the processing of the interrupt signals ensues by means of the interrupt management routine, dependent on this order of priority.

8. The method according to claim 1, characterized in that during the processing of the interrupt management routine, further data concerning interrupt signals are stored in the interrupt memory, which data occur during the processing of the interrupt management routine, and in that the interrupt management routine is not terminated until no data concerning interrupt signals are stored in the interrupt memory.

9. A method for operating a real-time computer system controlled by a real-time operating system, which computer system processes interrupt signals, comprising the following steps:

when an interrupt signal occurs, the real-time computer system interrupts any program processing at that time;

the acceptance of further interrupt signals is blocked, and an interrupt routine for this interrupt signal is executed, during the processing of the interrupt routine, a first group of program parameters of the program interrupted upon the occurrence of the interrupt signal is intermediately stored;

at least one datum concerning the interrupt signal is stored in an interrupt memory, branching to the interrupt routine ensuing dependent on the value of a blocking counter that counts the calls of non-interruptible routines of the real-time operating system;

the interrupt routine is temporarily halted and an interrupt management routine is executed, whereby the acceptance of further interrupt signals is again cleared during the processing of the interrupt management routine, the clearing of the acceptance of further interrupt signals ensuing at the beginning of the interrupt management routine;

during the processing of the interrupt management routine, the datum belonging to the interrupt signal in the interrupt memory is erased;

the remainder of the program parameters of the program that was interrupted upon an occurrence of the interrupt signal are intermediately stored;

depending on the datum of the interrupt signal in the interrupt memory, at least one reaction routine belonging to this interrupt signal is activated and, if warranted, is processed with activation of the real-time operating system; and after the processing of the interrupt management routine, the real-time operating system branches back to the program that was interrupted upon the occurrence of the interrupt signal, using the intermediately stored program parameters.

10. The method according to claim 9, characterized in that upon each calling of a non-interruptible routine the value of the blocking counter is increased, and after the processing of a non-interruptible routine the value of the blocking counter is correspondingly lowered.

11. The method according to claim 9 or 10, characterized in that, using the intermediately stored program parameters, before the interrupt routine is processed the real-time operating system branches back to the program that was interrupted upon the occurrence of the interrupt signal, if the blocking counter does not have a predetermined initial value or the interrupt management routine has not yet been fully processed.

12. The method according to one of claims 9 or 10, characterized in that the branching to the interrupt management routine ensues when the blocking counter has the predetermined initial value, and at least one datum concerning an interrupt signal is stored in the interrupt memory.

13. The method according to one of claims 5 to 8 or 10, characterized in that a restoring of the program parameters intermediately stored on the second stack memory allocated to the interrupt management routine does not ensue until no datum is stored in the interrupt memory.

14. The method according to one of claims 5 to 8 or 10, characterized in that a restoring of the program parameters intermediately stored on the first stack memory allocated to the interrupted program does not ensue until no datum is stored in the interrupt memory.

15. A method for operating a real-time computer system controlled by a real-time operating system, which computer system processes interrupt signals, comprising the following steps:

when an interrupt signal occurs, the real-time computer system interrupts any program processing at that time;

the acceptance of further interrupt signals is blocked, and an interrupt routine for this interrupt signal is executed;

during the processing of the interrupt routine, a first group of program parameters of the program interrupted upon the occurrence of the interrupt signal is intermediately stored;

at least one datum concerning the interrupt signal is stored in an interrupt memory, branching to an interrupt management routine depending upon whether at least one program routine, which may not be interrupted, is being processed in the computer system;

whereby the acceptance of further interrupt signals is again cleared during the processing of the interrupt management routine, the clearing of the acceptance of further interrupt signals ensuing at the beginning of the interrupt management routine;

during the processing of the interrupt management routine, the datum belonging to the interrupt signal in the interrupt memory is erased;

the remainder of the program parameters of the program that was interrupted upon an occurrence of the interrupt signal are intermediately stored;

depending on the datum of the interrupt signal in the interrupt memory, at least one reaction routine belonging to this interrupt signal is activated and, if warranted, is processed with activation of the real-time operating system;

after the processing of the interrupt management routine, the real-time operating system branches back to the program that was interrupted upon the occurrence of the interrupt signal, using the intermediately stored program parameters; and given several interrupt signals that follow upon one another, data belonging to these interrupt signals are stored in the interrupt memory.

16. A method for operating a real-time computer system controlled by a real-time operating system, which computer system processes interrupt signals, comprising the following steps:

when an interrupt signal occurs, the real-time computer system interrupts any program processing at that time;

the acceptance of further interrupt signals is blocked, and an interrupt routine for this interrupt signal is executed;

during the processing of the interrupt routine, a first group of program parameters of the program interrupted upon the occurrence of the interrupt signal is intermediately stored;

at least one datum concerning the interrupt signal is stored in an interrupt memory, branching to an interrupt management routine depending upon whether at least one program routine, which may not be interrupted, is being processed in the computer system;

whereby the acceptance of further interrupt signals is again cleared during the processing of the interrupt management routine, the clearing of the acceptance of further interrupt signals ensuing at the beginning of the interrupt management routine;

during the processing of the interrupt management routine, the datum belonging to the interrupt signal in the interrupt memory is erased;

the remainder of the program parameters of the program that was interrupted upon an occurrence of the interrupt signal are intermediately stored;

depending on the datum of the interrupt signal in the interrupt memory, at least one reaction routine belonging to this interrupt signal is activated and, if warranted, is processed with activation of the real-time operating system, the interrupt management routine not being terminated until no datum concerning an interrupt signal is stored in the interrupt memory;

during the processing of the interrupt management routine, further data concerning interrupt signals are stored in the interrupt memory, which data occur during the processing of the interrupt management routine; and after the processing of the interrupt management routine, the real-time operating system branches back to the program that was interrupted upon the occurrence of the interrupt signal, using the intermediately stored program parameters.

17. A method for operating a real-time computer system controlled by a real-time operating system, which computer system processes interrupt signals, comprising the following steps:

when an interrupt signal occurs, the real-time computer system interrupts any program processing at that time;

the acceptance of further interrupt signals is blocked, and an interrupt routine for this interrupt signal is executed;

during the processing of the interrupt routine, a first group of program parameters of the program interrupted upon the occurrence of the interrupt signal is intermediately stored;

at least one datum concerning the interrupt signal is stored in an interrupt memory, branching to an interrupt management routine depending upon whether at least one program routine, which may not be interrupted, is being processed in the computer system;

whereby the acceptance of further interrupt signals is again cleared during the processing of the interrupt management routine, the clearing of the acceptance of further interrupt signals ensuing at the beginning of the interrupt management routine;

during the processing of the interrupt management routine, the datum belonging to the interrupt signal in the interrupt memory is erased;

the remainder of the program parameters of the program that was interrupted upon an occurrence of the interrupt signal are intermediately stored, the remainder of the program parameters of the program that is interrupted upon the occurrence of the interrupt signal being intermediately stored partly in a first stack memory for program parameters, which memory is allocated to the interrupted program, and partly in a second stack memory for program parameters, which memory is allocated to the interrupt management routine;

depending on the datum of the interrupt signal in the interrupt memory, at least one reaction routine belonging to this interrupt signal is activated and, if warranted, is processed with activation of the real-time operating system; and after the processing of the interrupt management routine, the real-time operating system branches back to the program that was interrupted upon the occurrence of the interrupt signal, using the intermediately stored program parameters.

18. The method according to claim 17, characterized in that a restoring of the program parameters intermediately stored on the second stack memory allocated to the interrupt management routine does not ensue until no datum is stored in the interrupt memory.

19. The method according to claim 17, characterized in that a restoring of the program parameters intermediately stored on the first stack memory allocated to the interrupted program does not ensue until no datum is stored in the interrupt memory.

\* \* \* \* \*